United States Patent [19]

Eburn, Jr. et al.

[11] Patent Number: 4,508,142

[45] Date of Patent: Apr. 2, 1985

[54] ZERO DISPLACEMENT LOW-SHEAR VALVE

[75] Inventors: William H. Eburn, Jr., Sudbury, Mass.; Stephen P. Kalenik, Merrimack, N.H.

[73] Assignee: Polaroid Corporation, Cambridge, Mass.

[21] Appl. No.: 315,661

[22] Filed: Oct. 28, 1981

Related U.S. Application Data

[63] Continuation-in-part of Ser. No. 108,699, Dec. 31, 1979, abandoned.

[51] Int. Cl.³ .................. F16K 41/12; F16K 1/38; F16K 11/06
[52] U.S. Cl. .................. 137/625.4; 251/120; 251/133; 251/251; 251/229; 74/18.1
[58] Field of Search .............. 251/120, 133, 138, 251, 251/229; 137/625.4, 867, 625.5, 625.44; 74/18.1

[56] References Cited

U.S. PATENT DOCUMENTS

| 449,889 | 4/1891 | Turner | 251/138 |
| 829,120 | 8/1906 | Mumford | 137/625.5 |
| 916,403 | 3/1909 | Adamson | 137/625.5 |
| 1,177,100 | 3/1916 | Grandjean | 137/625.5 |
| 1,275,831 | 8/1918 | Barrett | 251/120 |
| 2,381,640 | 8/1945 | Brandstrom | 74/18.1 X |
| 3,011,515 | 12/1961 | Kravagna | 251/120 X |
| 3,217,192 | 11/1965 | Feightner | 251/133 X |
| 3,426,798 | 2/1969 | Chernak | 251/120 |

FOREIGN PATENT DOCUMENTS 2124122 4/1972 Fed. Rep. of Germany ................. 137/625.44
178640 11/1935 Switzerland .

Primary Examiner—Arnold Rosenthal
Attorney, Agent, or Firm—John J. Kelleher

[57] ABSTRACT

A low-shear valve for controlling fluid flow through a conduit does not change the volume of the fluid that it controls when it is actuated between its open and closed positions.

6 Claims, 9 Drawing Figures

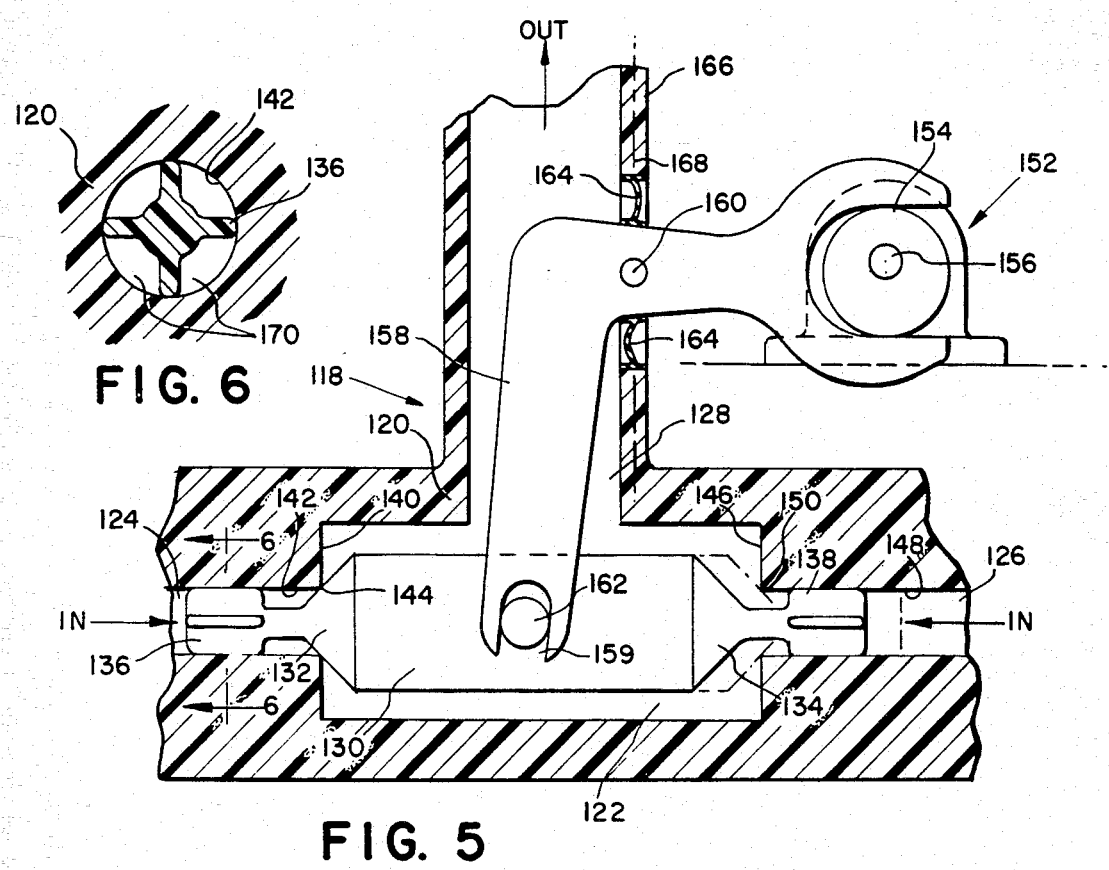
FIG. 6
FIG. 5
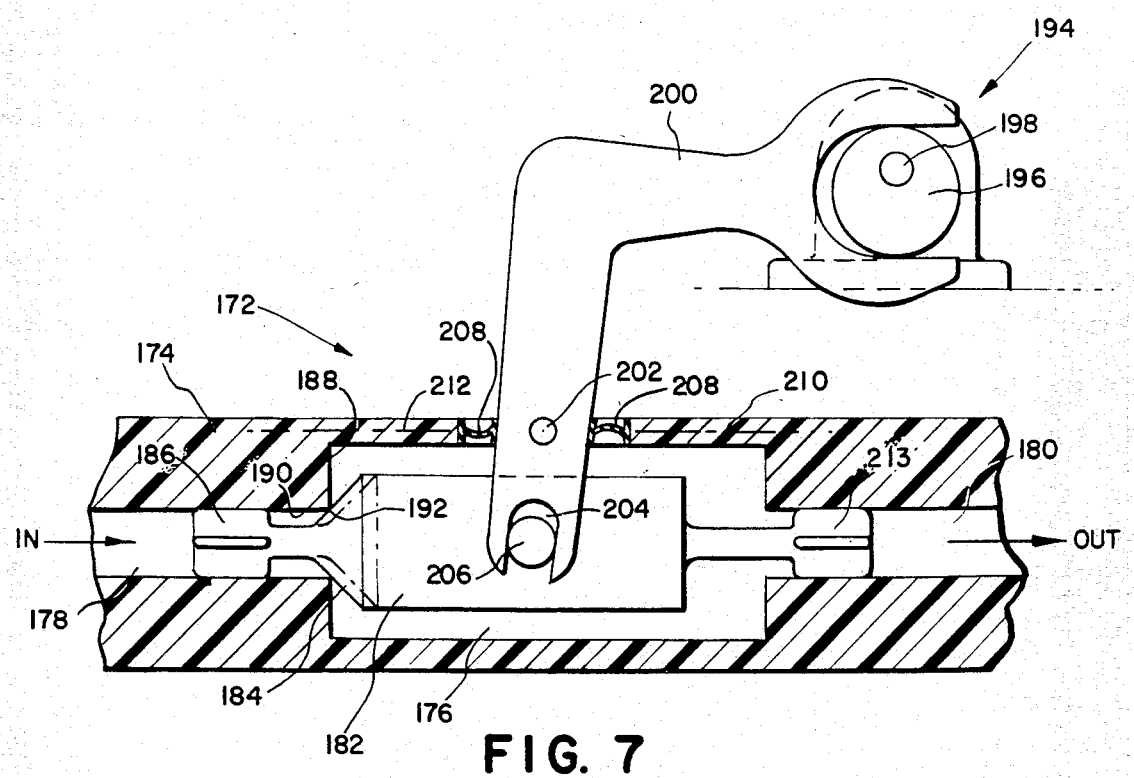
FIG. 7

ZERO DISPLACEMENT LOW-SHEAR VALVE

CROSS REFERENCE TO RELATED APPLICATION

This is a continuation-in-part of application Ser. No. 108,699, filed Dec. 31, 1979, now abandoned.

BACKGROUND OF THE INVENTION

1. Field of the Invention

The present invention relates to valves for controlling the flow of a fluid, in general, and to such apparatus for controlling the flow of a fluid in constant flow pumping apparatus, in particular.

2. Description of the Prior Art

In the operation of the present-day coating apparatus where coatings of critical thickness are desired to be deposited on a substrate such as a moving web for use in photographic film, it is necessary to precisely control the flow rate of liquid coating material from a liquid storage reservoir to a coating applicator such as an extrusion coater, which is one device that applies coating material to such a web. An extremely important factor for the control of coating thickness and variations in coating thickness is the control of the flow rate of the material of which said coating is formed, a said coating is being deposited on a substrate.

One piece of apparatus for use is controlling the flow of a coating fluid onto a substrate is the constant flow pump described in our copending U.S. patent application Ser. No. 108,700, filed on Dec. 31, 1979 (now U.S. Pat. No. 4,321,014) and assigned to the assignee of the present invention. In this pumping apparatus, it is necessary to continually interrupt the flow of coating material through portions of said pumping apparatus with valving, for proper pump operation.

Conventional valves utilize valve members that change the volume of the fluid they are controlling as a movable valve member moves into and/or out of its valve seat. Portions of the valve stem, for example that were outside of the valve housing when the valve was opened are moved inside the valve housing as the valve is moved to its valve seat, thereby displacing the controlled fluid and increasing its effective volume. If such conventional valve were utilized in the pumping apparatus of the above-cited patent application, unwanted changes in the flow rate of the material pumped by said pumping apparatus would result. In addition, if the flow rate of coating materials for use in photographic film, for example, were interrupted by such conventional valves, shearing of the coating materials would occur as said materials are compressed between the valve and its valve seat, which would detrimentally change the physical properties of the photographic coating materials so compressed.

It is an object of the present invention to provide a valve for controlling the flow of a fluid that will not change the volume of the fluid that it controls when operated between its opened and closed positions and that will minimize the amount of shearing of said fluid when said valve is moved into its valve seat to interrupt fluid flow.

SUMMARY OF THE INVENTION

In accordance with the teachings of the present invention, a valve for controlling the flow of a fluid is provided that does not change the volume of said fluid when operated between its opened and closed positions. Means are also provided for coupling a force to the movable valve member within the valve housing that also does not change the volume of the controlled fluid. In addition, when said valve is actuated to its closed position, minimum shearing of the controlled fluid occurs between the valve and its valve seat.

BRIEF DESCRIPTION OF THE DRAWINGS

FIG. 5 is a schematic of a preferred embodiment of the two outlet valves schematically depicted in the pumping apparatus of FIG. 1, combined into a single valve assembly.

FIG. 6 is a sectional view taken on the line 6—6 in FIG. 5.

FIG. 7 is a schematic diagram, in elevation, of one of the outlet valves of the pumping apparatus of FIG. 1.

DESCRIPTION OF THE PREFERRED EMBODIMENTS

Figure 1:
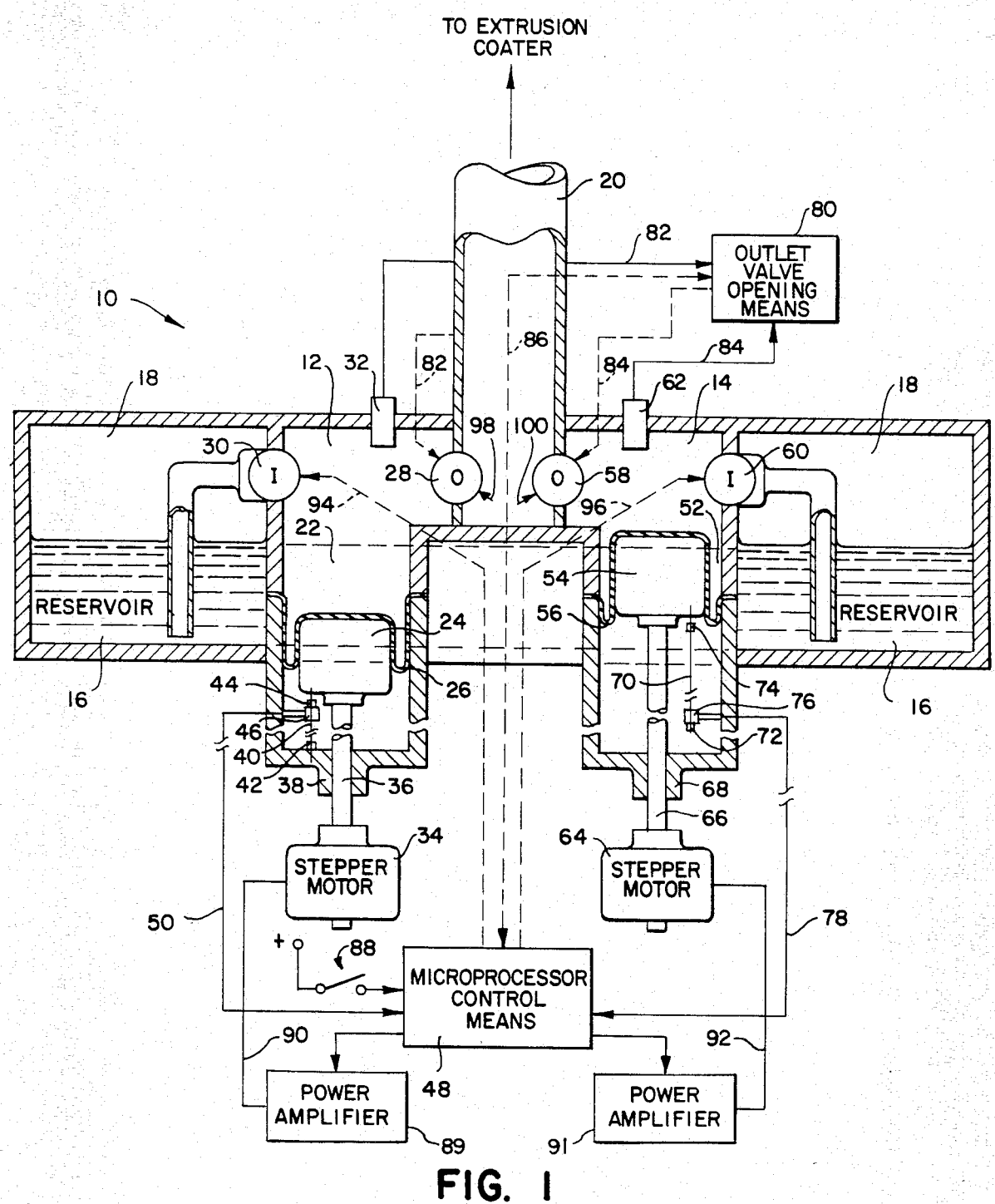
FIG. 1 is a schematic diagram of an elevational view, partially in section, of pumping apparatus incorporating the low-shear, zero displacement valve of the present invention.

Referring now to the drawings, and specifically to FIG. 1, pumping apparatus 10 incorporating one embodiment of the inventive concept of the present invention is depicted. Pumping apparatus 10 includes pumping chambers 12 and 14 into which pumpable material 16 flows from reservoir 18, is pressurized and then delivered to common conduit 20. Pumpable material flows out of the reservoir because said reservoir has a slightly positive pressure head. Pumping chamber 12 includes cylinder 22 into which pumping member or piston 24 and rolling seal 26 radially connected between said cylinder 22 and the end of said piston 24, have been fitted. Rolling seal 26 is of the type disclosed in U.S. Pat. No. 3,488,763 to LOSQUIST, JR., a device that minimizes friction between said piston 24 and said cylinder 22 and the contamination of material 16 as it is being pumped by pumping apparatus 10.

Pumping chamber 12 also includes outlet valve 28 for controlling the flow of material 16 from chamber 12 to common conduit 20, inlet valve 30 for controlling the flow of material 16 from reservoir 18 to pumping chamber 12 and pressure sensor 32 for sensing the pressure in pumping chamber 12. Outlet valve 28 will be decribed in greater detail below with respect to FIGS. 5, 6 and 7. Reciprocating movement of piston 24 is generated by bidirectional stepper motor 34 which is coupled to said piston 24 by lead screw 36. Screw threads (not shown) in housing 38 cooperatively engage the threads (not shown) of lead screw 36. Reciprocating movement of piston 24 is produced when lead screw 36 is twisted in said cooperating threads in said housing 38 by stepper motor 34.

Rod 40 which is fixedly attached to and extends vertically downward from piston 24 has upper limit and lower limit microswitch actuators 42 and 44, respectively, that are attached to and project laterally outward from said rod 40. Piston travel sensor 46 includes a set of microswitches that are actuated when engaged by said actuators 42 and 44 at preselected travel positions of piston 24. Piston travel information produced by piston travel sensor 46 is routed to microprocessor control means 48 through path 50. The function of microprocessor control means 48 will be explained elsewhere herein.

Pumping chamber 14 includes cylinder 52 into which pumping member or piston 54 has been fitted, and rolling seal 56 which has the same function as rolling seal 26 described above with respect to pumping chamber 12.

Pumping chamber 14 also includes outlet valve 58 for controlling the flow of material 16 from chamber 14 to common conduit 20, inlet valve 60 for controlling the flow of material 16 from reservoir 18 to pumping chamber 14 and pressure sensor 62 for sensing the pressure in pumping chamber 14. Outlet valve 58 will be described in detail below with respect to FIGS. 5, 6 and 7. Reciprocating movement of piston 54 is generated by bidirectional stepper motor 64 which is coupled to said piston 54 by lead screw 66. Screw threads (not shown) in housing 68 cooperatively engage the threads (not shown) of lead screw 66. Reciprocating movement of piston 54 is produced when lead screw 66 is twisted in said cooperating threads in said housing 68 by said stepper motor 64.

Rod 70 which is fixedly attached to and extends vertically downward from piston 54 has upper limit and lower limit microswitch actuators 72 and 74, respectively, that are attached to and project laterally outward from said rod 70. Piston travel sensor 76 includes a set of microswitches that are actuated when engaged by said actuator 72 and 74 at preselected travel positions of piston 54. Piston travel information produced by piston travel sensor 76 is routed to microprocessor control means 48 through path 78.

Pressure sensors 32 and 62 sense the pressures in chambers 12 and 14, respectively, and the pressure information produced by these sensors is routed to outlet valve opening means 80 through paths 82 and 84, respectively. Outlet valve opening means 80 is actually a part of microprocessor control means 48. However, for convenience only, opening means 80 and microprocessor control means 48 have been shown as separate entities. Outlet valve opening means 80 determines when the pressures in chambers 12 and 14 are equal and utilize this information to open outlet valves 28 and 56, at the appropriate time, by sending valve opening signals through paths 82 and 84. Outlet valve opening means 80 also advises microprocessor control means 48 as to when the pressures in chambers 12 and 14, as sensed by sensors 32 and 62, are equal, by sending a signal that includes such information through path 86.

Microprocessor control means 48, which is connected to a source of electrical power (not shown) through switch 88, has preprogrammed control instructions incorporated therein for controlling the rate of rotation of stepper motors 34 and 64 for controlling the opening and closing of inlet valve 30 and 60, and for controlling the closing of outlet valve 28 and 58. Microprocessor control signals for stepper motors 34 and 64 are routed through power amplifier 89 and path 90, and power amplifier 91 and path 92, respectively; microprocessor control signals for controlling inlet valve 30 and 60 are routed through paths 94 and 96, respectively; and microprocessor control signals for controlling the closing of outlet valves 28 and 58 are routed through paths 98 and 100, respectively. The particular point in time when microprocessor control means 48 produces these control signals is dependent upon piston travel information provided by piston travel sensors 46 and 76 and chamber pressure information provided by outlet valve opening means 80. The sequence of operation or timing of these signals is best understood by additionally referring herein to FIGS. 2 and 3.

Figure 2:
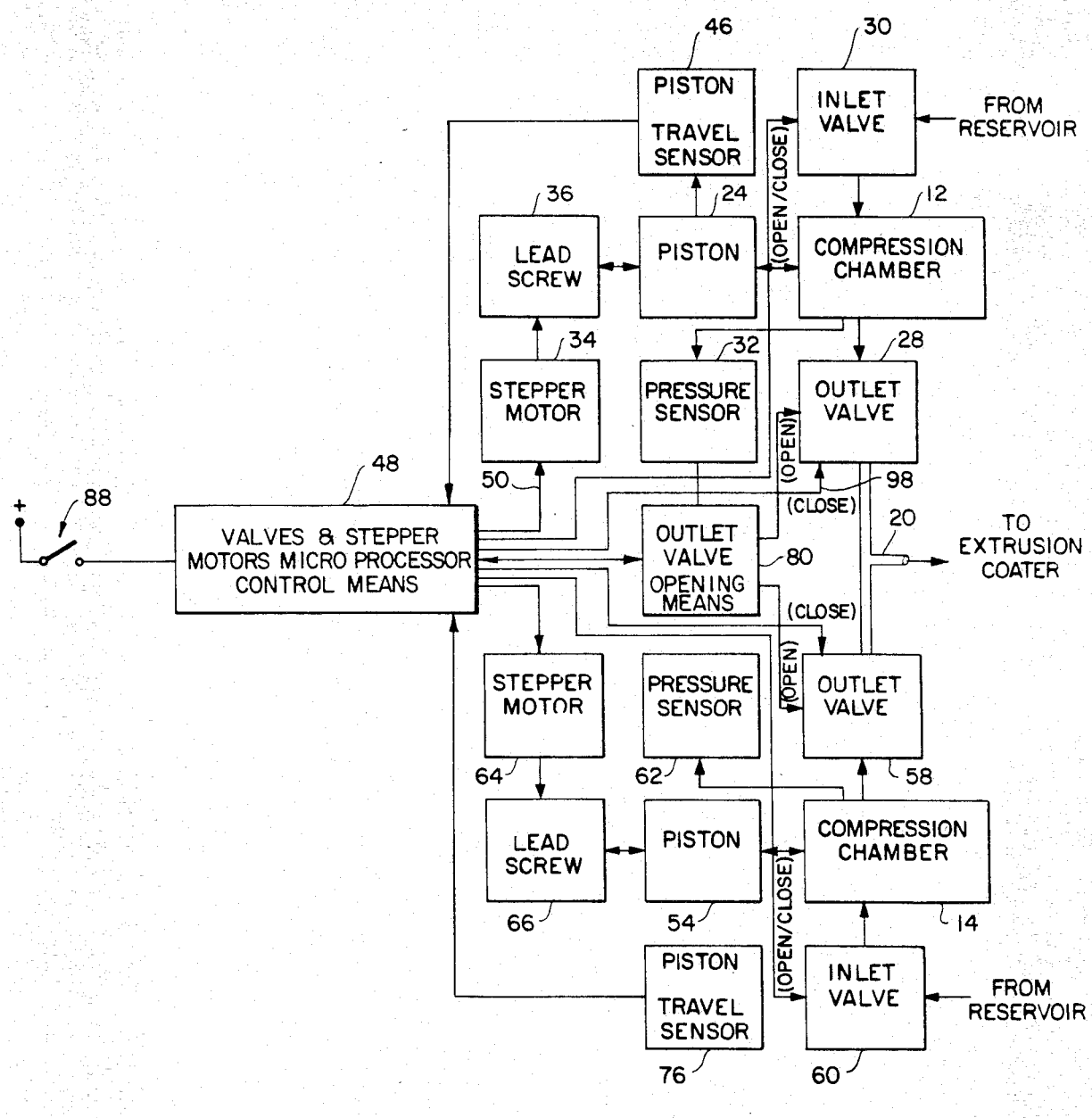
FIG. 2 is a signal flow, functional block diagram of the control system that controls the pumping apparatus depicted in FIG. 1.
Figure 3:
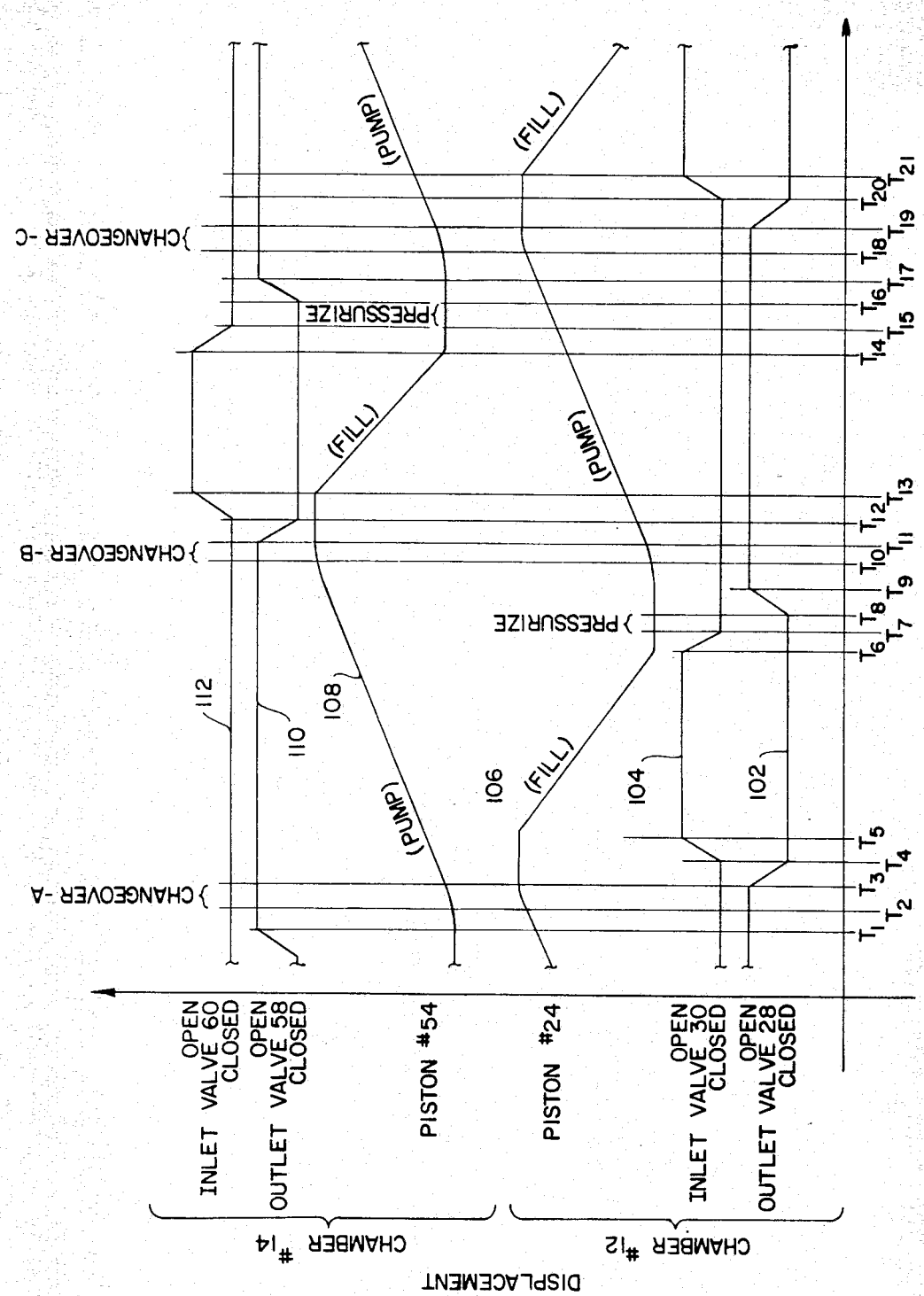
FIG. 3 is a time line showing the displacement and sequence of operation of the valves and pistons in the pumping apparatus of FIG. 1.

FIG. 2 is a signal flow block diagram of a control system for controlling the pumping apparatus of FIG. 1, and FIG. 3 is a time line showing the time and the extent of displacement of the input valves, output valves, and pistons in the pumping apparatus of said FIG. 1. In FIG. 3, the movement of outlet valve 28 and inlet valve 30 of pumping chamber 12 corresponds to traces 102 and 104, respectively; the movement of pistons 24 and 54 in cylinders 22 and 52, respectively, correspond to traces 106 and 108, respectively; and the movement of outlet valve 58 and inlet valve 60 of pumping chamber 14 correspond to traces 110 and 112, respectively, with all of said movements varying as a function of time.

A convenient starting point in the description of the sequence of operation of the pumping apparatus of FIG. 1 is to assume that outlet valves 28 and 58 are in the open position; that inlet valves 30 and 60 are in the closed position; that pumpable material 16 is being moved through outlet valve 28 of pumping chamber 12 into common conduit 20 by the upward movement of piston 24 within cylinder 22; and that pumping chamber 14 has been filled with material 16 and that this material has previously been pressurized to the same pressure as that of the material in said chamber 12. This condition occurs at time $T_1$ in the time line of FIG. 3.

Referring now to FIGS. 1, 2 and 3, and progressing from time $T_1$ to time $T_2$, at time $T_2$ upper limit microswitch actuator 42 actuates piston travel sensor 46 as it is moved to a preselected upper travel limit of piston 24 by the rotation of lead screw 36 in housing 38 and the rotation of stepper motor 34. The upper limit signal produced by said sensor 46 is routed to microprocessor control means 48 through path 50. Prior to time $T_2$, microprocessor control means 48 was transmitting a constant rate of pulses to stepper motor 34 through path 90 causing the constant rate of rotation of said stepper motor 34 and a corresponding constant rate of linear upward movement of piston 24 in cylinder 22, said piston 24 being coupled to said motor 34 as previously described. This upper limit signal is, in effect, instructions to microprocessor control means 48 that piston 24 is nearing the current limit of its ability to push material 16 through outlet valve 28 and into common conduit 20 and that it is time to change over to another source of material 16 and means for moving same into said common conduit 20.

Upon receipt of said upper limit signal by microprocessor control means 48 at time $T_2$, said control means 48 starts reducing the number of pulses that it is transmitting to stepper motor 34 which reduces the rate of upward movement of piston 24, and simultaneously, and to the same extent, starts sending pulses to stepper motor 64 through path 92 in accordance with preprogrammed instructions in said control means 48 causing said stepper motor 64 to start moving piston 54 upward until the rate of pulses being sent to stepper motor 34 has been reduced to zero and the rate of pulses being sent to stepper motor 64 has been increased by control means 48 to the pulse rate that was being applied to stepper motor 34 immediately prior to time $T_2$. More specific details of the times of occurrence and the rates of change of the pulses that are applied to stepper motors 34 and 64 by microprocessor control means 48 when changing from one pumping chamber combination to another, will be discussed below with reference to FIG. 4.

With continued reference to FIGS. 1, 2 and 3, at time $T_3$ changeover from pumping chamber 12 to pumping chamber 14 is complete in that all of the material 16 being supplied to common conduit 20 is being moved through pumping chamber 14 by the upward movement of piston 54 at said time $T_3$. In addition, at time $T_3$ microprocessor control means 48 sends a preprogrammed valve close signal through path 98 to initiate the closing of chamber 12 outlet valve 28. By operating outlet valve 28 when the pressures on each side of same are equal little, if any, shearing of the pumped material occurs which minimizes changes to the physical properties of the said pumped material.

At time $T_4$ said outlet valve 28 is fully closed and at that time microprocessor control means 48 sends a preprogrammed valve open signal through path 94 to initiate the opening of chamber 12 inlet valve 30. At time $T_5$ inlet valve 30 is fully opened and said time $T_5$ microprocessor control means 48 sends motor reverse signal pulses to stepper motor 34 through path 90 which reverses the rotational direction of stepper motor 34 and the linear direction of piston 24 mechanically coupled thereto. The reverse diretion linear speed of piston 24 is approximately twice that of its upward or forward direction. Material 16 in reservoir 18 begins to flow through inlet valve 30 and into pressure chamber 12 and cylinder 22 under the influence of the pressure in reservoir 18 at said time $T_5$. A pressure head is maintained in reservoir 18 to prevent the collapse of rolling seal 26.

Just prior to time $T_6$ the downward or cylinder 22 filling movement of piston 24 is terminated by microprocessor control means 48 in response to a lower piston travel limit signal from piston travel sensor 46, and at said time $T_6$ said microprocessor control means 48 sends a preprogrammed valve close signal through path 94 to initiate the closing of chamber 12 inlet valve 30. In this the preferred embodiment, the downward or cylinder filling movement of piston 24 is approximately twice the rate of its upward or material 16 pumping movement. At time $T_7$ inlet valve 30 has fully closed and at said time $T_7$ microprocessor control means 48 sends a preprogrammed sequence of pulses to stepper motor 34 to cause said motor 34 to move piston 24 upward and compress the material 16 within pumping chamber 12 if the pressure in pumping chamber 12 is less than the pressure in pumping chamber 14 as determined by outlet valve opening means 80, information that is routed to said microprocessor control means 48 through path 86. When the pressure in said pumping chamber 12 is equal to the pressure on material 16 in pumping chamber 14 as determined by pressure sensors 32 and 62 and outlet valve opening means 80, which occurs at time $T_8$, a signal indicating such pressure equalization is sent to microprocessor control means 48 by outlet valve opening means 80 through path 86 which causes said control means 48 to terminate the pressurizing rotation of stepper motor 34 and to initiate the opening of outlet valve 28 once such stepper motor 34 rotation has been terminated. Outlet valve 28 is opened when the pressures on both sides are equal, which minimizes shearing of the pumped material. At time $T_9$ outlet valve 28 has fully opened and stepper motor 34 is in a quiescent state waiting for a series of pulses from microprocessor control means 48 that will cause said stepper motor 34 to rotate and move piston 24 upward in cylinder 22 and push material 16 within pumping chamber 12 through outlet valve 28 and into common conduit 20.

At time $T_{10}$ upper limit microswitch actuator 72 actuates piston travel sensor 76 as it is moved to a preselected upper travel limit of piston 54 by the rotation of lead screw 66 in housing 68 and the rotation of stepper motor 64. The upper limit signal produced by said sensor 76 is routed to microprocessor control means 48 through path 78. Immediately prior to time $T_{10}$, control means 48 was transmitting a constant rate of pulses to stepper motor 64 through path 92 causing a constant rate of rotation of said stepper motor 64 and a corresponding constant rate of linear upward movement of piston 54 in cylinder 52, said piston 54 being coupled to said motor 64 as previously described. The upper limit signal produced by piston travel sensor 76 notifies control means 48 that piston 54 is near the current limit of its ability to push material 16 through outlet valve 58 and into common conduit 20, and that it is time to change over to another source of said material 16 and means for moving same into said common conduit 20.

Upon receipt of the upper limit signal from piston travel sensor 76 by microprocessor control means 48 which occurs at time $T_{10}$, said control means 48 starts reducing the number of digital pulses that is transmitting to stepper motor 64 which reduces the rate of upward movement of piston 54, and simultaneously, and to the same extent, start sending pulses to stepper motor 34 through path 90 in accordance with preprogrammed instructions in said control means 48 causing said stepper motor 34 to start moving piston 24 upward until the rate of pulses being sent to stepper motor 64 has been reduced to zero and the rate of pulses being sent to stepper motor 34 has been increased by control means to the pulse rate that was being applied to stepper motor 64 immediately prior to time $T_{10}$.

At time $T_{11}$ changeover from pumping chamber 14 to pumping chamber 12 is complete in that all of the material 16 being supplied to common conduit 20 is being moved through pumping chamber 12 by the upward movement of piston 24 at said time $T_{11}$. In addition, at time $T_{11}$, microprocessor control means 48 sends a preprogrammed valve close signal through path 100 to initiate the closing of chamber 14 outlet valve 58. Outlet valve 58 is closed when the pressures on both sides are equal, which minimizes shearing of the pumped material.

At time $T_{12}$ outlet valve 58 is fully closed and at that time, microprocessor control means 48 sends a preprogrammed valve open signal through path 96 to initiate the opening of chamber 14 inlet valve 60. At time $T_{13}$ inlet valve 60 is fully opened and at said time $T_{13}$ microprocessor control means 48 sends a motor reverse signal to stepper motor 64 through path 92 which reverses the rotational direction of stepper motor 64 and the linear direction of piston 54 mechanically coupled thereto. The reverse direction linear speed of piston 54 is approximately twice that of its upward or forward direction. Material 16 in reservoir 18 begins to flow through inlet valve 60 and into pumping chamber 14 under the influence of the pressure in reservoir 18 at said time $T_{13}$. A pressure head is maintained in the reservoir to prevent the collapse of rolling seal 56.

Just prior to time $T_{14}$ the downward or cylinder 52 filling movement of piston 54 is terminated by microprocessor control means 48 in response to a lower piston travel limit signal from piston travel sensor 76, and at said time $T_{14}$ said microprocessor control means 48 sends a preprogrammed valve close signal through path 96 to initiate the closing of chamber 14 inlet valve 60. At time $T_{15}$ inlet valve 60 has fully closed and at said time $T_{15}$ microprocessor control means 48 sends a preprogrammed sequence of pulses to stepper motor 64 to cause said motor 64 to move piston 54 upward to compress the material 16 within pumping chamber 14 if the pressure in pumping chamber 14 is less than the pressure in pumping chamber 12 as determined by outlet valve opening means 80, information that is routed to said microprocessor control means 48 through path 86. When the pressure in said pumping chamber 14 is equal to the pressure on material 16 in pumping chamber 12 as determined by pressure sensors 32 and 62 and outlet valve opening means 80, which occurs at time $T_{16}$, a signal indicating such pressure equalization is sent to microprocessor control means 48 by outlet valve opening means 80 through path 86 which causes said control means 48 to terminate the pressurizing rotation of stepper motor 64 and to initiate the closing of inlet valve 60 once such stepper motor 64 rotation has been terminated. At time $T_{16}$ microprocessor control means 48 also initiates the opening of chamber 14 outlet valve 58. Outlet valve 58 is opened when the pressures on both sides of same are equal, which minimizes shearing of the pumped material. At time $T_{17}$ outlet valve 58 has fully opened and stepper motor 64 is in a quiescent state waiting for a series of pulses from microprocessor control means 48 that will cause said stepper motor 64 to rotate and move piston 54 upward in cylinder 52 and push material 16 within pumping chamber 14 through outlet valve 58 and into common conduit 20.

At time $T_{18}$ another changeover from chamber 12, stepper motor 34/piston 24 to chamber 14, stepper motor 64/piston 54 is initiated by the actuation of piston travel sensor 46 by upper limit microswitch actuator 42. The sequence of operations that occur at times $T_{18}$, $T_{19}$, $T_{20}$ and $T_{21}$ are the same as the sequence of operations that occur at times $T_2$, $T_3$, $T_4$ and $T_5$, respectively. Changeovers in the manner described from times $T_1$ through $T_{21}$ from the pumping and filling apparatus associated with chamber 12 to the pumping and filling apparatus associated with chamber 14, and vice versa, will continue so long as the above-described pumping apparatus of the present invention continues to operate in the manner described above.

Figure 4:
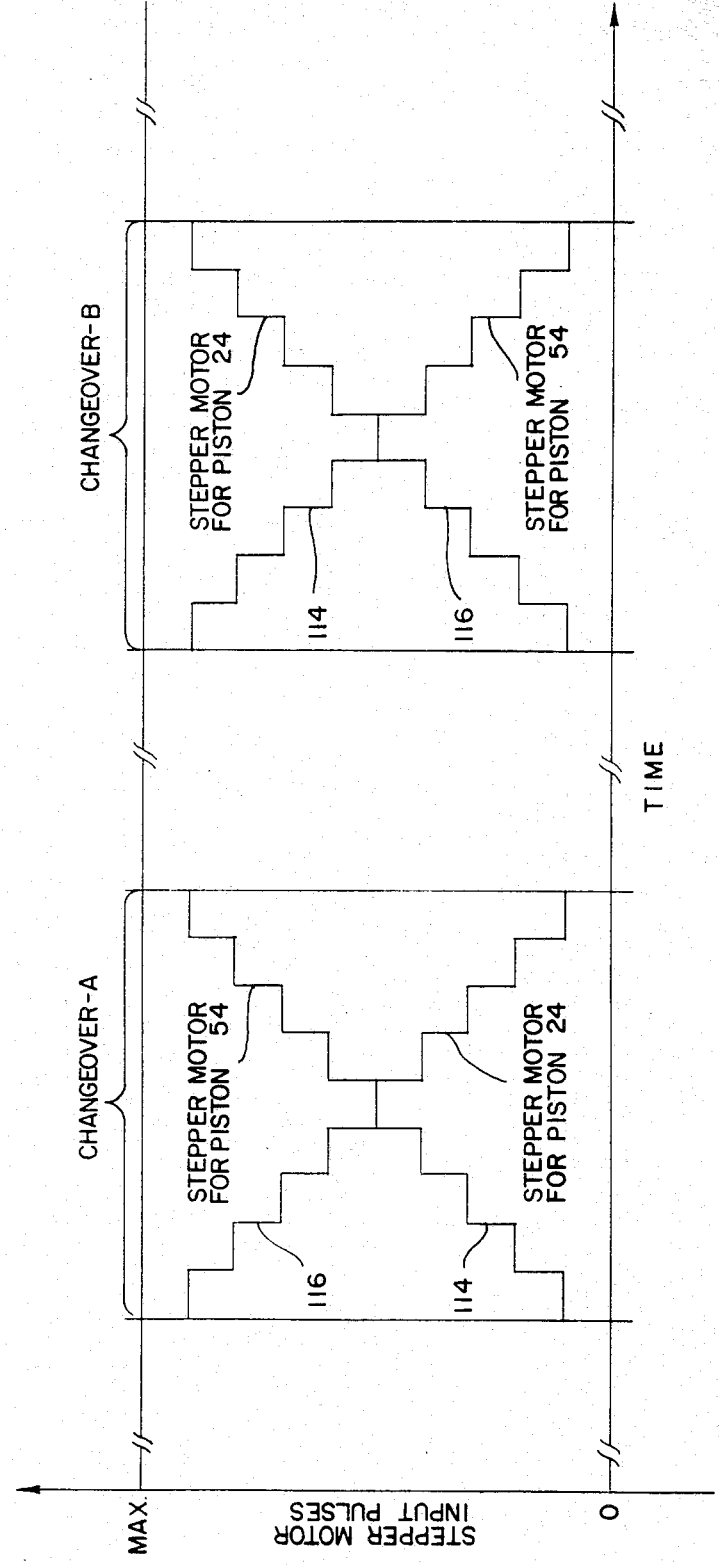
FIG. 4 is a simplified time line of stepper motor movement of each of the stepper motors of FIG. 1 during two pumping chamber changeovers.

In FIG. 4, two traces, 114 and 116, show the times of occurrence and the rates of change of the pulses that are applied to stepper motors 34 and 64 by microprocessor control means 48 when changing from one pumping chamber to another. These two changeover sequences are designated changeover A and changeover B in both FIGS. 3 and 4. Referring now to FIGS. 3 and 4, during changeover A, the rotational speed of stepper motor 34 and the linear speed of piston 24 which is mechanically coupled to said stepper motor 34 are reduced from a maximum rate of speed to zero and the rotational speed of stepper motor 64 and the linear speed of piston 54 which is mechanically coupled to said stepper motor 64 are increased from zero to their maximum rates of speed. At any point in time during either changeover A or changeover B, the sum of the pulses being applied to both stepper motors 34 and 64 is always equal to the number of pulses being applied to either stepper motor 34 or stepper motor 64 immediately before or immediately after said changeovers A or B. During changeover A, every time an input pulse is added to the input of stepper motor 64 (piston 54), an input pulse is simultaneously subtracted from the input to stepper motor 34 (piston 24) until the rate of rotation of stepper motor 34 is reduced to zero and the rate of rotation of stepper motor 64 has increased to what the rate of rotation of stepper motor 34 was immediately prior to the occurrence of changeover A. Also, during changeover B, every time an input pulse is added to the input of stepper motor 34 (piston 24), an input pulse is simultaneously subtracted from the input to stepper motor 64/piston 54 until the rate of rotation of stepper motor 64 is reduced to zero and the rate of rotation of stepper motor 34 has increased to what the rate of rotation of stepper motor 64 was immediately prior to the occurrence of changeover B.

FIG. 5 depicts dual outlet valve assembly 118 which is the functional equivalent of the combination of outlet valves 28 and 58 in the pumping apparatus of FIG. 1. Dual valve assembly 118 includes housing 120 having valve chamber 122 formed therein. Valve chamber 122 communicates with inlet conduits 124 and 126, of circular cross section, through which pumpable material 16 (FIG. 1) would flow into valve chamber 122 from pumping chambers 12 or 14 (FIG. 1), respectively, if dual valve assembly 118 were utilized in pumping apparatus 10 of FIG. 1 instead of outlet valves 28 and 58. Valve chamber 122 also communicates with circular cross section outlet conduit 128 into which pumpable material 16 (FIG. 1) flows from valve chamber 122 and out of which said material flows to, for example, a coating applicator.

Movable or valve member 130 has conical portions 132 and 134 at opposite ends thereof and has fluted valve guides 136 and 138 projecting from the conical portions 132 and 134 of said valve member, respectively. Wall portion 140 of valve chamber 122 having a flat or planar surface, intersects cylindrical wall portion 122 of conduit 124 and forms circular edge 144 that functions as a valve seat for conical portion 132 of valve member 130. Similarly, wall portion 136 of valve chamber 122 having a flat or planar surface intersects cylindrical wall portion 148 of conduit 126 and forms circular edge 150 that functions as a valve seat for conical portion 134 of valve 130.

Valve stepper motor 152 makes a quarter revolution for each series of input pulses from microprocessor control means 48 (FIG. 1) and from outlet valve opening means 80 (FIG. 1) which, as previously explained, actually forms a part of said microprocessor control means 48. Single lobe cam 154 is fixedly mounted on stepper motor output shaft 156 for rotation therewith. Arm 158 is mounted on outlet valve assembly 118 for pivotal movement about axis 160. One end of arm 158 engages cam 154 and slot 159 at the other end of arm 158 engages pin 162 projecting from valve 130. Arm 158 projects through resilient diaphragm 164 in wall portion 166 of outlet conduit 128, said diaphragm 164 being in a sealing relationship with said arm 158 and said wall portion 166. Arm 158 pivot axis 160 is in plane 168 which is the relaxed or neutral plane of diaphragm 164.

A valve actuation signal from microprocessor control means 48 or outlet valve opening means 80 causes cam 154 to rotate one-quarter revolution, said cam 154 causing arm 158 to rotate about axis 160 and move valve 130 into the position shown in FIG. 5 where conical surface 132 of said valve 130 engages edge or seat 144 to thereby terminate the flow of pumpable material 16 (FIG. 1) into valve chamber 122. Valve 130 and a portion of arm 158 are already emersed in the material being pumped and therefore these members do not change the volume of said material when they are moved for valve actuation. The lower portion of diaphragm 164 bows in at the bottom when valve 130 is moved to the position shown in FIG. 5 which would appear to increase the volume of material being pumped. However, the top portion of diaphragm 164 bows out which compensates for the lower portion of said diaphragm 164 bowing in, the effect of this arrangement being that there is no net volume change in the material being pumped by such diaphragm 164 movement.

Valve member 130 is laterally centered in valve chamber 122 by identically shaped fluted valve guides 136 and 138. A cross section of valve 136 taken along the line 6—6 in FIG. 5 shows the ends of the symmetrically spaced radial fins of valve guide 136 in contact with or in close proximity to cylindrical wall portion 142 of inlet conduit 124. As valve 130 moves in valve chamber 122 along the coincident longitudinal axes of inlet conduit 124 and outlet conduit 126, movement of said valve 130 at right angles to said longitudinal axes is limited by the engagement of the fins of valve guides 136 and 138 with the walls of the conduits in which they move. Material flowing into valve chamber 122 from conduits 124 or 126 pass through grooves such as grooves 170 (FIG. 6) in valve guide 136 provides a self-cleaning action for said grooves 170.

Valve 130 is sequentially moved into three different positions by the forces generated by valve stepper motor 152 and the means that couple said forces to said valve 130. Valve 130 prevents the movement of material from inlet conduit 124 into chamber 122 when it is in the position shown in FIG. 5, as previously explained. When cam 154 is rotated an additional quarter turn, it is laterally centered within valve chamber 122 such that material can enter said valve chamber 122 from both inlet conduit 124 and inlet conduit 126. When cam 154 is rotated an additional quarter turn, conical portion 134 of valve 130 engages valve seat 150 to terminate the flow of material from inlet conduit 126 into valve chamber 122. Material continues to flow into valve chamber 122 from inlet conduit 124, however. When cam 154 is rotated an additional quarter turn, valve 130 again moves to the later center of valve chamber 122 where material flow from inlets 124 and 126 into valve chamber 122 can once again occur. This sequence of operations is continuously repeated as valve stepper motor 152 rotates, in the same direction, in quarter turn increments.

FIG. 7 is a single zero displacement valve and operates in the same manner as one of the valves of dual outlet valve assembly 118 in FIG. 5. Single zero displacement valve 172 can be used as either outlet valve 28 or outlet valve 58 in the pumping apparatus of FIG. 1. Valve assembly 172 includes housing 174 having valve chamber 176 formed therein. Valve chamber 176 communicates with inlet conduit 178 and outlet conduit 180, of circular cross section, through which pumpable material 16 (FIG. 1) would flow into and out of valve chamber 176, respectively, if valve assembly 172 were utilized for outlet valve 28 and outlet valve 58 in the pumping apparatus of FIG. 1. Material flowing out of conduit 180 would flow into common conduit 20 and then to a coating applicator, for example.

Movable or valve member 182 has conical portion 184 at one end thereof and has fluted valve guide 186 projecting from said conical portion 184. Wall portion 188 of valve chamber 176 having a flat or planar surface, intersects cylindrical wall portion 190 of conduit 178 and forms circular edge 192 that functions as a valve seat for conical portion 184 of valve member 182. Valve stepper motor 194 makes a half of a revolution for each series of input pulses from microprocessor control means 48 (FIG. 1) and from outlet valve opening means 80 (FIG. 1) which, as previously explained, actually forms a part of said microprocessor control means 48. Single lobe cam 196 is fixedly mounted on stepper motor output shaft 198 for rotation therewith. Arm 200 is mounted on outlet valve assembly 172 for pivotal movement about axis 202. One end of arm 200 engages the cam 196 and slot 204 at the other end of said arm 200 engages pin 206 projecting from valve member 182. Arm 200 projects through resilient diaphragm 208 in wall portion 210 of outlet conduit 180, said diaphragm 208 being in a sealing relationship with said arm 200 and said wall portion 210. Arm 200 pivot axis 202 is in plane 212 which is the relaxed or neutral plane of diaphragm 208.

A valve actuation signal from microprocessor control means 48 or outlet opening means 80 causes cam 196 to rotate one-half revolution, said cam 196 causing arm 200 to rotate about axis 202 and move valve member 182 into the position shown in FIG. 6 where conical surface 184 of said valve member 182 engages edge or seat 192 to thereby terminate the flow of pumpable material 16 (FIG. 1) into valve chamber 176. Valve member 130 and a portion of arm 200 are already immersed in the material being pumped, and therefore, these members do not change the volume of said material when they are moved for valve actuation. The left portion of diaphragm 208 bows in when valve member 130 is moved to the position shown in FIG. 7 which would appear to increase the volume of the material being pumped. However, the right hand portion of diaphragm 208 bows out, which compensates for the left hand portion of the diaphragm 208 bowing in, the effect of this arrangement being that there is no net volume change in the material being pumped by the movement of diaphragm 208.

As explained above, arm 158, for example, schematically depicted in FIG. 5 rotates about axis 160 which is an axis through the neutral plane or the fully relaxed position of resilient diaphragm 164. The function of said diaphragm 164 is to provide a resilient annular fluid-seal between arm 158 and wall portion 166 of outlet conduit 128. Axis 160 through the plane of annular fluid-seal 164 divides said seal into two equal halves such that, as explained above, as the lower half of said seal 164 bows in under the influence of the downward movement of the outer portion of arm 158 such seal movement would appear to increase the volume of the fluid within conduit 128. However, simultaneously therewith, the top portion of said seal 164 bows outward thereby fully neutralizing any fluid volume changes that might otherwise be produced by said lower, bowing in portion of seal 164. A more detailed description of how a valve arm similar to valve arm 158 is mounted so that it is able to pivot about an axis through a resilient arm-to-housing fluid-seal similar to diaphragm or seal 164 will now be described with respect to FIGS. 8 and 9.

Figure 8:
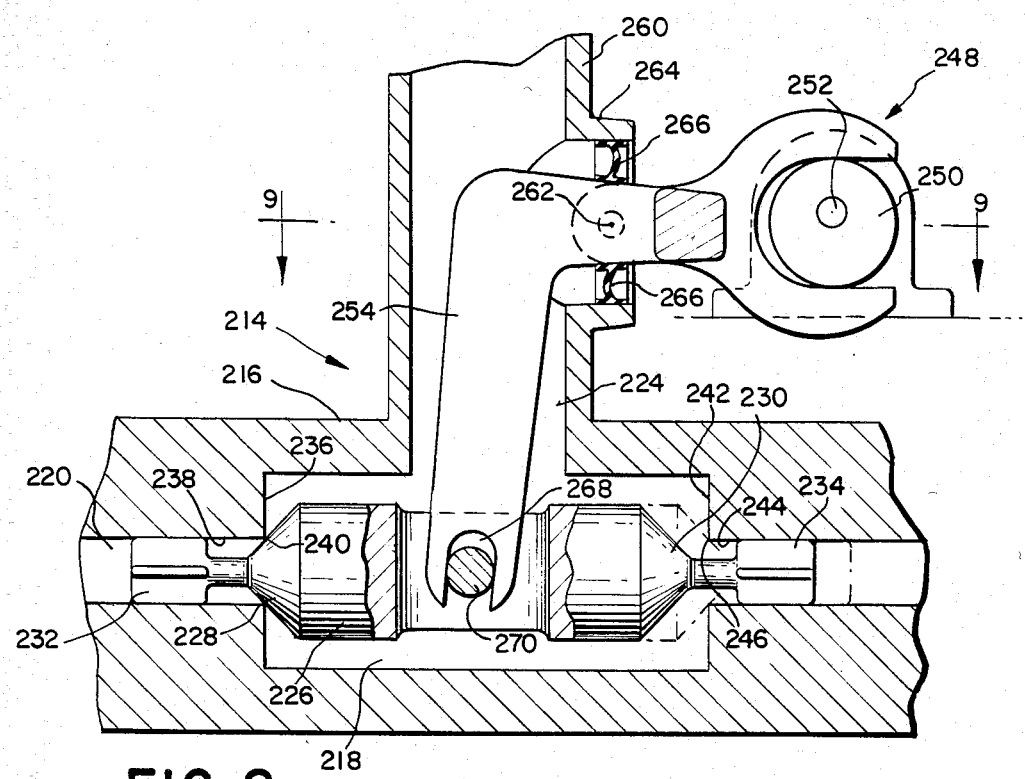
FIG. 8 is a detailed schematic of a dual valve assembly similar to that depicted in FIG. 5.
Figure 9:
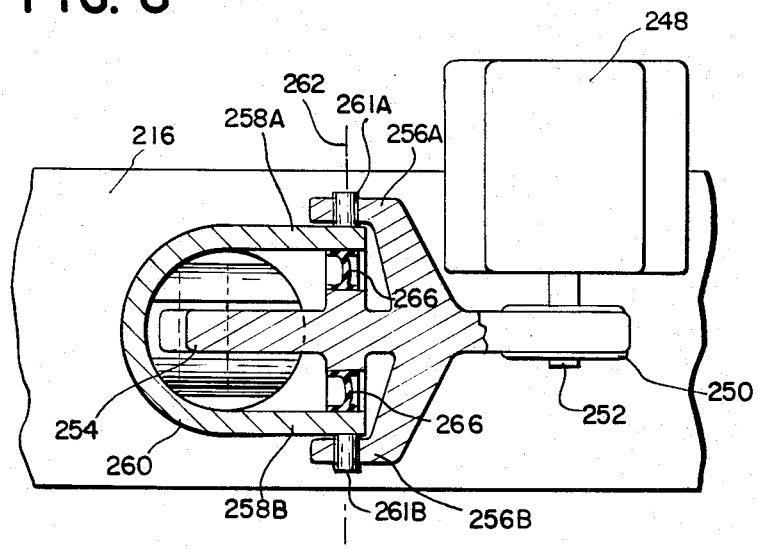
FIG. 9 is a partial sectional view taken on the line 9—9 in FIG. 8.

Referring now to FIGS. 8 and 9, numeral 214 represents a dual outlet valve that is structurally similar and functionally equivalent to valve assembly 118 in FIG. 5. Valve assembly 214 includes housing 216 having valve chamber 218 formed therein. Valve chamber 218 communicates with inlet conduits 220 and 222, of circular cross section, through which pumpable material 16 (FIG. 1) would flow into valve chamber 218 from pumping chambers 12 or 14 (FIG. 1) respectively, if valve assembly 214 were utilized in pumping apparatus 10 of FIG. 1 instead of separate outlet valves 28 and 50. Valve chamber 218 also communicates with circular cross section outlet conduit 224 into which pumpable material 16 (FIG. 1) flows from valve chamber 218 and out of which the material flows to, for example, a coating applicator.

Movable valve member 226, which is circular in cross section, has conical portions 228 and 230 at opposite ends thereof and has fluted valve guides 232 and 234 projecting from the ends of conical portions 228 and 230 of said valve member 226, respectively. Wall portion 236 of valve chamber 218, having a flat or planar surface, intersects cylindrical wall portion 238 of conduit 220 thereby forming circular edge 240 that functions as a valve seat for conical portion 228 of valve member 226. Similarly, wall portion 242 of valve chamber 218, having a flat or planar surface, intersects cylindrical wall portion 244 of conduit 222 thereby forming circular edge 246 that functions as a valve seat for conical portion 230 of valve member 226.

Valve stepper motor 248 makes a quarter revolution turn for each series of input pulses from microprocessor control means 48 (FIG. 1) and from outlet valve opening means 80 (FIG. 1) which forms a part of said microprocessor control 40. Single lobe cam 250 is fixedly mounted on stepper motor output shaft 252 for rotation therewith. Arm 254 includes tangs 256A and 256B that extend laterally from said arm 254 with the ends of said tangs having openings therethrough for cooperative engagement with fixedly mounted pins about which said arm 254 and said tangs 256A and 256B, projecting therefrom, may be rotated. Parallel extending ears 258A and 258B project laterally from wall 260 of conduit 224. Pins 261A and 261B are mounted, in a fixed position, on said ears 258A, 258B, respectively, with their longitudinal axes at right angles to said ears 258A, 258B along axis of rotation 262. Annular boss 264 projects laterally through and is at right angles to said conduit wall 260 and, in turn, said arm 254 extends through annular boss 264 such that the opening in tangs 256A and 256B cooperatively engage pins 261A and 261B, respectively, in a rotational relationship, thereby enabling said arm 254 to pivot about said rotational axis 262. The periphery of resilient annular diaphragm 266 is sealingly attached to the inner surface of annular boss 264 in a fluid-type relationship and the inner portion of said diaphragm 266 is sealingly attached to arm 254, also in a fluid-tight relationship. In its relaxed or neutral state, diaphragm 266 is flat or planar and is in a plane that passes through rotational axis 262. As can be most clearly seen in FIG. 9, even though rotational axis 262 is in the same plane as diaphragm 266, pins 261A and 261B that provide the rotational axis for arm 254 do not physically extend or pass through said diaphragm 266. This arrangement provides rotational axis 262 for arm 254 without the necessity of providing a complex fluid-tight interface between the structure that provides the rotational capability for arm 254 and said resilient fluid-sealing diaphragm 266.

One end of arm 254 engages cam 250 while slot 268 at the opposite end of arm 254 engages pin 270 projecting laterally from valve member 226. A valve actuation signal from microprocessor control means 48 (FIG. 1) and/or outlet opening means 80 (FIG. 1) causes stepper motor 248 and cam 250 that is coupled thereto to rotate one-quarter revolution, said cam 250 causing arm 254 to rotate about axis 262 and move valve member 226 into, for example, the position shown in FIGS. 8 and 9 where conical surface 228 of said valve member 226 engages edge or seat 240 to thereby preclude the flow of pumpable material 16 (FIG. 1) through conduit 220 into valve chamber 218. Valve member 226 and a portion of arm 254 are already immersed in the material being pumped and therefore these members do not change the volume of said material when they are moved for valve actuation. As explained above, because of the location of rotational axis 262 with respect to resilient diaphragm 266, any change in the volume of the material being pumped that might otherwise result from diaphragm flexing is fully neutralized. Subsequent pulses to stepper motor 248 will cause said stepper motor to move valve member 226 in the same manner that stepper motor 152 moves valve member 130 in valve assembly 118 that is shown in FIG. 5.

Valve member 182 (FIG. 7) is laterally centered in valve chamber 176 by identically shaped fluted valve guides 186 and 213. These valve guides function in the same manner as valve guides 136 and 138 in valve assembly 118 depicted in FIG. 5.

Valve member 182 is moved into three different positions by the forces generated by valve stepper motor 194 and the means that couples said force to said valve member 182. Valve member 182 prevents the movement of material from inlet conduit 178 into chamber 176 when it is in the position shown in FIG. 7, as previously explained. When cam 196 rotates one-half turn, valve member 182 is moved to its full open position, such that material can enter said valve chamber 176 from inlet conduit 178. When cam 196 is rotated an additional one-half turn, conical portion 184 of valve member 182 engages valve seat 192 to terminate the flow of material from conduit 178 to valve chamber 176. This sequence of operations is continuously repeated as valve stepper motor 194 rotates, in the same direction, in half-turn increments.

It will be apparent to those skilled in the art from the foregoing description of our invention that various improvements and modifications can be made in it without departing from its true scope. The embodiments described herein are merely illustrative and should not be viewed as the only embodiments that might encompass our invention.

What is claimed is:

1. A valve for controlling the flow of a fluid, comprising:
    a housing for enclosing a particular volume of fluid, said housing having an inlet and an outlet for the passage of a fluid therebetween;
    a movable member within said housing, movable between first and second positions for alternately blocking and unblocking fluid flow within said housing between said housing inlet and outlet, without changing the said fluid volume enclosed by said valve housing;

an elongated force coupling member projecting through an opening in a wall of said housing; and a resilient, generally planar diaphragm that provides a fluid-tight seal between said elongated member and that portion of said housing wall through which said elongated member projects with a portion of said diaphragm being sealingly attached to said elongated member for movement therewith and with said elongated member being pivotally supported external of said resilient diaphragm and being pivotable about an axis within the plane of said generally planar diaphragm, about which neutral fluid-moving diaphragm movement of said particular volume of fluid occurs, when said elongated member is so pivoted.

2. Apparatus in accordance with claim 1, wherein said force for moving said movable member between said first and second positions is mechanical.

3. Apparatus in accordance with claim 1, wherein a portion of said movable member has a conical surface for engagement with a valve seat that is formed by two intersecting surfaces, wherein line contact is made between said conical surface and said valve seat when said movable member is moved to the position where it blocks said fluid flow.

4. Apparatus in accordance with claim 1, wherein said inlet and said outlet are formed by conduits and wherein said movable member has movable member guide portions projecting from opposite ends thereof for movement within an inlet conduit or an outlet conduit, said movable member guide portions permitting movement of said controlled fluid through said inlet and said outlet conduits when positioned in said inlet or said outlet conduits.

5. Apparatus in accordance with claim 1, wherein said valve has first and second inlets and an outlet and said movable member blocks said first inlet but not said second inlet when said movable member is in said first position, and blocks said second inlet but not said first inlet when said movable member is in said second position.

6. Apparatus in accordance with claim 2, wherein said mechanical force is generated by a stepper motor having a plurality of positions to which the rotatable member of said stepper motor sequentially moves in response to stepper motor input signals, said rotatable stepper motor member being coupled to said movable member by means including a rotatably mounted cam whose axis of rotation is in a fixed relation with respect to said rotatable stepper motor.

* * * * *